(No Model.) 4 Sheets—Sheet 1.

E. TYDEN.
CORN PLANTER.

No. 353,834. Patented Dec. 7, 1886.

Witnesses.
W. Rossiter
Otto Lubbert

Inventor:
Emil Tyden
By Wm H Lotz
Atty.

(No Model.) 4 Sheets—Sheet 2.

E. TYDEN.
CORN PLANTER.

No. 353,834. Patented Dec. 7, 1886.

Witnesses.
W. Rossiter
Otto Lubkert

Inventor
Emil Tyden
By Wm H Lotz
Atty.

(No Model.) 4 Sheets—Sheet 3.
E. TYDEN.
CORN PLANTER.
No. 353,834. Patented Dec. 7, 1886.
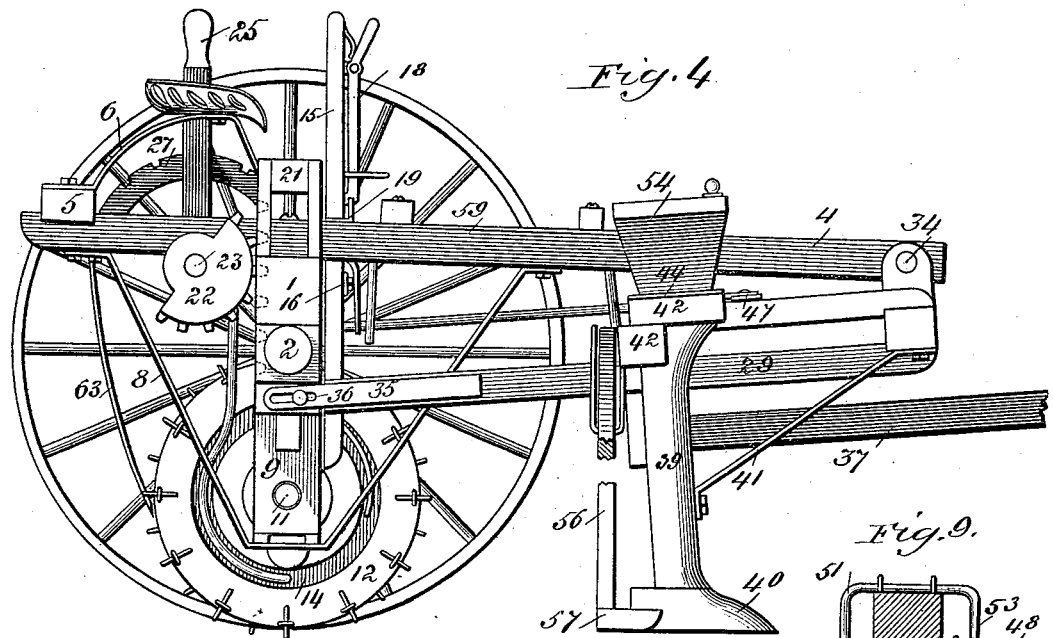
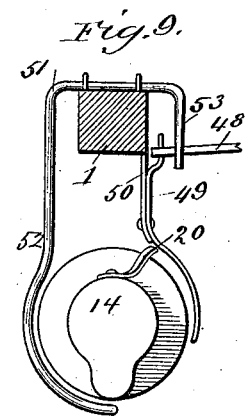
Witnesses
W. Rossiter
Otto Lubkert
Inventor
Emil Tyden
By Wm H Lotz
Atty.

(No Model.) 4 Sheets—Sheet 4.
E. TYDEN.
CORN PLANTER.
No. 353,834. Patented Dec. 7, 1886.
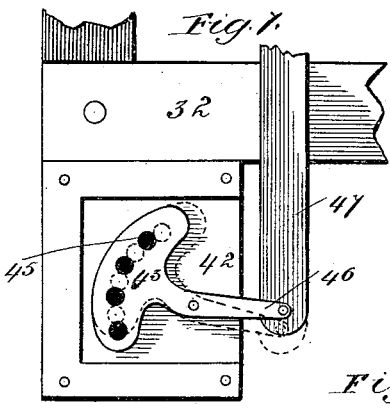
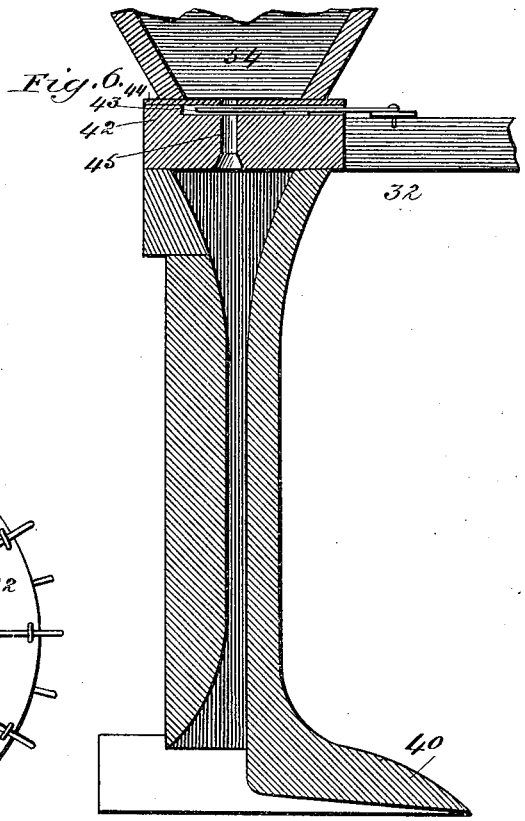
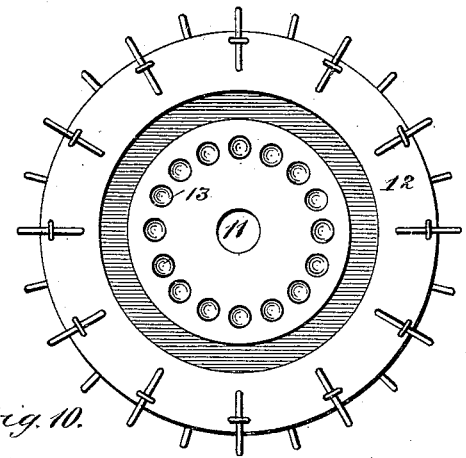
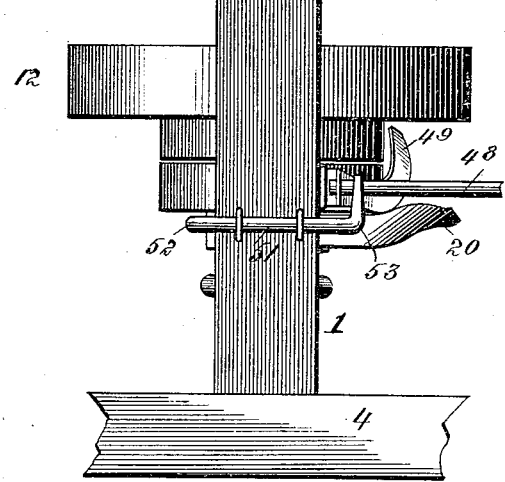
Witnesses.
N. Rossiter
Otto Lubbert
Inventor
Emil Tyden
By, Wm. C. Lotz
Atty.
N. PETERS, Photo-Lithographer, Washington, D. C.

UNITED STATES PATENT OFFICE.

EMIL TYDEN, OF CHICAGO, ILLINOIS.

CORN-PLANTER.

SPECIFICATION forming part of Letters Patent No. 353,834, dated December 7, 1886.

Application filed September 21, 1886. Serial No. 214,114. (No model.)

*To all whom it may concern:*

Be it known that I, EMIL TYDEN, a subject of the King of Sweden, residing at Chicago, in the county of Cook and State of Illinois, have invented certain new and useful Improvements in Corn-Planters, of which the following is a specification, reference being had therein to the accompanying drawings.

This invention relates to machines for planting corn; and it has for its object to provide a machine pulled by horses, which machine will plow up two parallel furrows, will drop therein the seed-corn at proper distances apart, and will then close the furrows again; also, to provide markers for indicating the line for the two rows of corn to be planted with the next or return movement of the machine.

My invention therefore consists of the novel devices and combinations of devices hereinafter described and specifically claimed.

Figure 1:
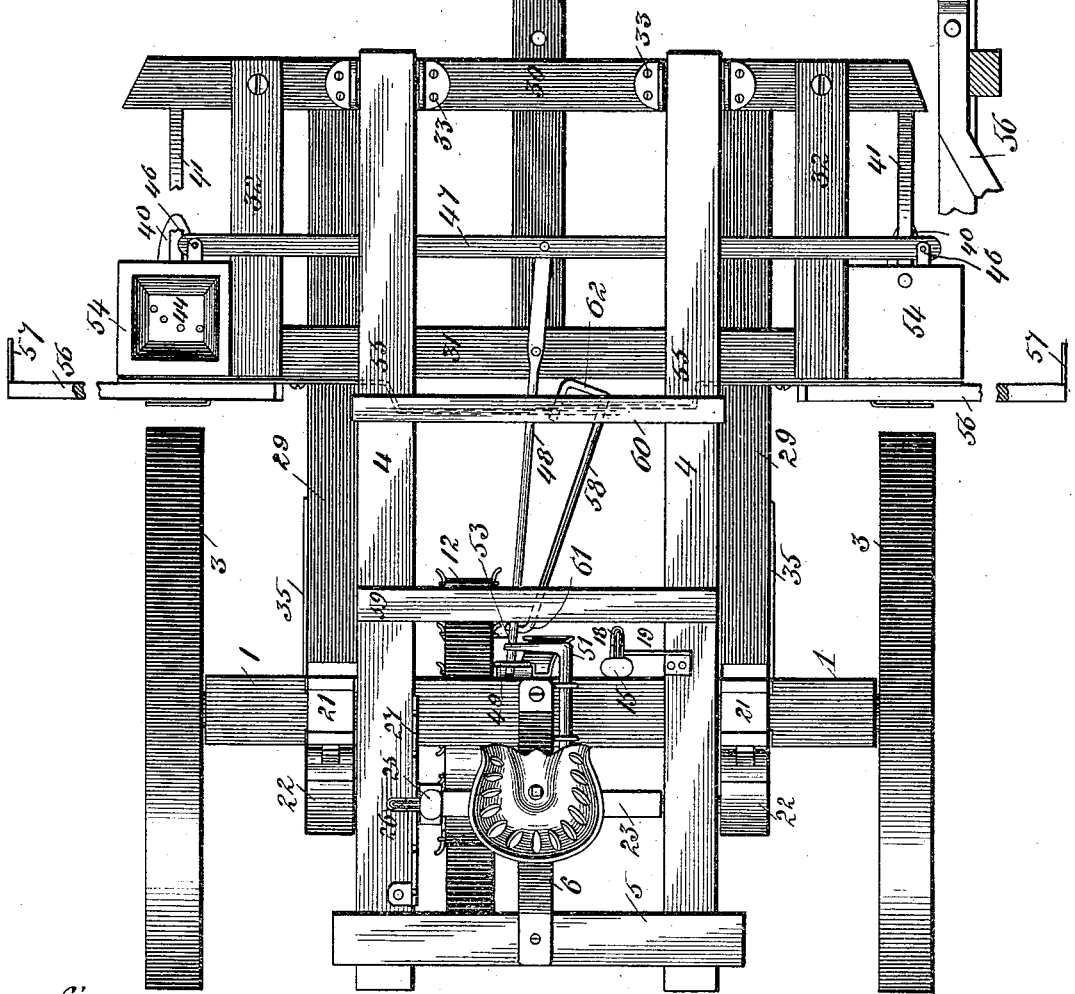
Figure 2:
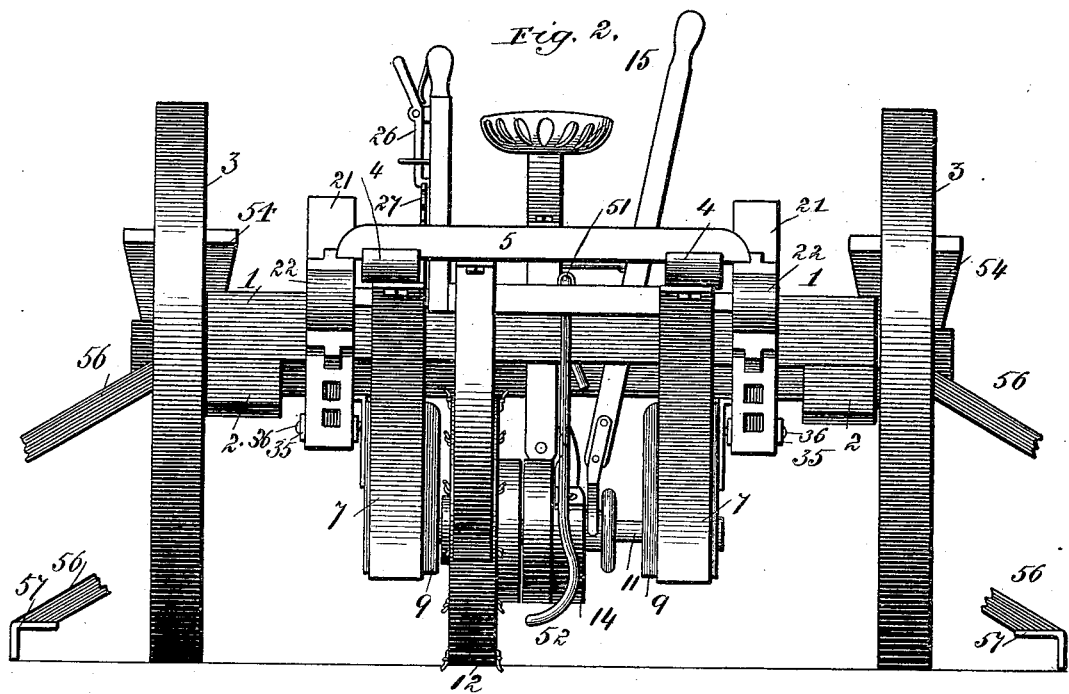
Figure 3:
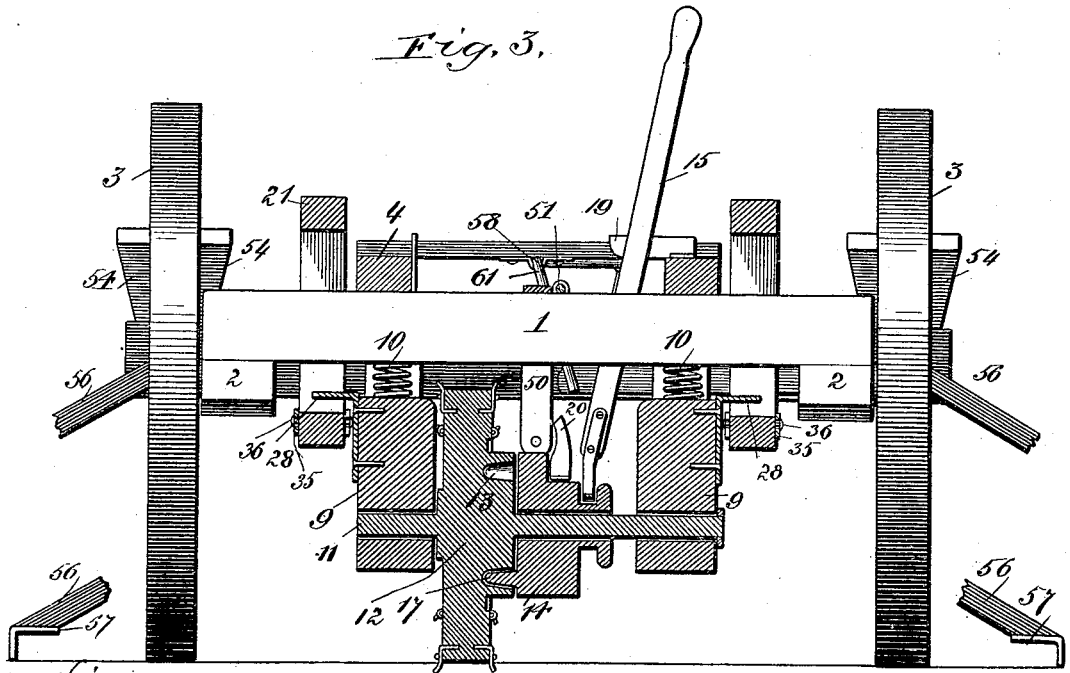

In the accompanying drawings, Figure 1 represents a plan of the machine; Fig. 2, a rear elevation of the same; Fig. 3, a vertical cross-section of the machine through the center line of the traction-wheel shaft; Fig. 4, a side elevation, and Fig. 5 a longitudinal vertical section, of the machine. Fig. 6 represents a longitudinal vertical section through one of the plows with seed-drop attachment; Fig. 7, a detached plan of the seed-valve; Fig. 8, an elevation of the traction-wheel detached; Fig. 9, an elevation of the cam-clutch and rocker-arms; Figs. 10 and 11, plans of double rocker-arm as vibrated from the movement of the traction-wheel by the cam-arms of the clutch, and Fig. 12 is a detached view of the marker-arms and operating device.

The same reference-characters designate like parts in the several figures of the drawings.

The axle-beam 1 has trunnions 2 secured under its ends for the hubs of broad-rimmed wagon-wheels 3, that carry the machine. Upon the axle-beam 1 are secured two longitudinal timbers, 4, connected at their rearward overhanging ends by a transverse beam, 5, upon which and the axle-beam is secured the frame 6, supporting the driver's seat. Pendent bars 7 are rigidly framed into the axle-tree 1 at each side thereof and just below timbers 4, each pair of such bars being connected at their bottom ends and braced to the timbers 4 by a V-shaped bar, 8. Journal-boxes 9 are guided between the pendent bars 7, these boxes being provided with flanges that will hold them laterally in position, and between each such box and the axle-tree is interposed a spiral spring, 10. Upon a shaft, 11, journaled in boxes 9, is rigidly mounted the traction-wheel 12, having teeth to its rim that will press into the ground and will prevent slipping of such wheel. The inward face of the hub of this wheel 12 has a series of conical sockets, 13, equal distance apart and from the center of shaft, and a shifting clutch, 14, is sleeved loose to be moved laterally upon shaft 11 by a lever, 15, that engages the annular groove of such clutch 14, and is pivotally secured against the forward side of the axle-tree by a bolt, 16. The clutch 14 has a single conical tooth, 17, that will engage with any one of the sockets 13 of traction-wheel 12. The lever 15 is in position to be operated from the driver's seat and for locking it in its two positions, either for holding the clutch coupled or out of connection with the traction-wheel 12. This lever has pivotally secured against one side a swinging pawl, 18, engaging with either one of two notches of bracket 19, secured upon one of the timbers 4. Upon the rim of clutch 14 is secured a cam-arm, 20, which, as hereinafter will be explained, will impart motion to the operating parts of the machine.

Exterior to the pendent bars 7, forming the guides for journal-boxes 9, are arranged vertically-sliding frames 21, each being rectangular and guided on a notched outer portion of axle-beam 1. On the vertical edge of each frame 21 is formed a rack-bar meshing with a segmental gear-wheel, 22, and both gear-wheels 22 are mounted upon a shaft, 23, journaled in boxes 24, secured under the longitudinal timbers 4. Upon this shaft 23 is also secured a lever, 25, in a position to be in easy reach of the driver from his seat, and, to one side, this lever 25 has attached a swinging pawl, 26, engaging with any one of a series of notches of quadrant 27, secured upon one of the longitudinal timbers 4. By means of this lever the frames 21 can be raised or lowered, and can be locked in a higher or lower position. An angular bar, 28, secured to each journal-box 9, extends into its adjoining frame 21 in a manner that the lifting of such frames 21 will also lift such boxes 9.

An auxiliary frame is composed of two longitudinal timbers, 29, connected by transverse timbers 30 and 31, projecting beyond the longitudinal bars, where they are connected again by short longitudinal timbers 32. The timber 30 has brackets 33 secured upon its top face, which brackets embrace the ends of the longitudinal timbers 4 of the main frame and are pivotally connected by bolts 34. The rear ends of timbers 29 have plates 35 secured to their ends, the projecting ends of which plates have longitudinally-slotted holes, and embrace the lower ends of vertically-sliding frames 21, to which they are pivotally coupled, each by a screw or pin, 36, in a manner that the elevating of such frames 21 will also lift the rear end of the auxiliary frame. The pole 37 is pivotally secured in a V-box, 38, secured under the center of transverse timber 31.

To the bottom of each end of transverse timber 30 is rigidly framed a tubular leg, 39, having to its bottom end a plow-shoe, 40. The tube in this leg being funnel-shaped on top, its bottom outlet at the heel of the shoe 40 is formed flaring toward the rear. Each leg 39 is steadied by a brace-bar, 41, extended to transverse bar 30.

Directly above each plow-leg 39 is secured upon transverse timber 31 a square wooden plate, 42, recessed for a fan-shaped valve, 43, pivoted upon such plate 42 in a manner to allow a vibrating movement to such valve, and over this valve 43 is secured upon plate 42 a metal plate, 44. This metal plate 44, as well as wooden plate 42, have each one, two, or more perforations, 45, which perforations of the two plates, however, are not in line with each other, and the interposed valve 43 has corresponding holes, which when such valve is oscillated will be in line alternately with the holes in one plate and the other, whereby a kernel of corn dropping through a hole in plate 44 into the corresponding opening in valve 43, with the next movement of such valve it will be carried over and drop through the opening of plate 42, and into and through the tubular plow-leg 39.

The valve 43 should be only a trifle thicker than the diameter of a kernel of corn, for the purpose that each perforation of valve 43 only can hold a single kernel. In the drawings, four such perforations 45 have been shown, part of which, however, may be covered by a suitable plate when it is not desired to seed as many kernels with each operation. Hoppers 54 are secured upon plates 44, in which a sufficient quantity of seed-corn is carried, and from which the feed is supplied. The two arms 46 of valves 43 are connected by a bar, 47, in a manner to move simultaneously. The center of this connecting-bar 47 is pivotally coupled to the end of a vibrating lever, 48, which lever is pivotally secured upon transverse timber 31, with its rear end entering the eyed end of rocking bar 49, pivoted at about its center to a pendant, 50, that is rigidly secured against the axle-tree 1. The lower end of bar 49 is curved to engage with cam-arm 20 of clutch 14 in a manner to be pushed by such cam-arm in the direction away from the traction-wheel 12.

A rocker-shaft, 51, is pivotally secured upon axle-tree 1. This rocker-shaft 51 has two pendent arms, 52 and 53, extending over the sides of the axle-tree, the arm 52 of which reaches to and partly around clutch 14 at the side opposite to rocking bar 49, and is also curved to be acted upon by the rotation of cam-arm 20, being pushed in the same direction as rocking bar 49. The other arm, 53, being much shorter than arm 52, it has a bifurcated end engaging the vibrating lever 48. The cam-arm 20, striking alternately bar 49 and arm 52, one imparts a reverse motion from the other to lever 48, whereby the valves 43 are once opened and closed with each revolution of the traction-wheel.

Against the rear edge of transverse timber 31 are pivotally secured two bars, 55, the inward horizontal ends of which overlap each other, while against their outward inclined ends are secured rods 56, each provided at its outward end with an angle-plate, 57, shaped somewhat like a hoe. These rods extend in an inclined direction to near the ground, with the hoe-edge reaching outward beyond the center line of the plow-shoe just one-half the distance as between centers of the two plow-shoes. These arms or rods are vertically vibrated by a rocker-shaft, 58, pivoted under transverse beams 59 and 60, which are secured upon longitudinal timbers 4, such rocker-shaft 58 having connected to one end an arm 61, that leans against lever 48, to receive movement therefrom, and at its opposite end it has an L-shaped arm, 62, which occupies a somewhat angular position relative to arm 61, and presses upon and thereby transmits a vibrating motion to bars 55 and 56 in a manner to alternately lift the angle-plates 57, and then to drop the same again, whereby with each such movement the angle-plate 57 will make an impression upon the ground, which impressions will be on a line parallel with the line of travel of the machine, and will form a trail for the driver to follow with one of the plow-shoes 40 and wheels 3 during the next movement of the machine over the field, thereby planting the corn in parallel rows equal distance apart. A scraper-bar, 63, is secured under beam 5, for removing clods sticking to the traction-wheel.

As the machine is drawn over the field, the plow-shoes 40 will cut furrows into which the corn is dropped from the automatic feeder through the tubular plow-legs, which furrows will be closed again by the wheels 3 following and passing over the same.

For pulling the machine to or from the field, the driver will lift and hold the traction-wheel 12, plow-shoes 40, and arms 56, to clear the roadway, by operating lever 25, and while turning the machine for each next row, or where he does not want corn to drop, the driver can stop the automatic feed by laterally shifting clutch 14 by means of lever 15, to be uncoupled from the traction-wheel 12.

What I claim is—

1. In a corn-planter, the combination, with the main frame supported on wheels and having pendent guides for the traction-wheel journal-boxes, of an auxiliary frame hinged at its front end to the main frame and carrying the plow-shoes and seeding mechanism, and of vertically-sliding frames operated by a lever and adapted to elevate the traction-wheel and auxiliary frame, substantially as set forth.

2. In a corn-planter, the combination, with traction-wheel 12, having conical sockets, of shifting-clutch 14, having tooth 17 and cam-arm 20, and of suitable connections with such cam-arm for transmitting an oscillating movement to the seed-box valves, substantially as set forth.

3. In a corn-planter, the combination, with traction-wheel 12, mounted upon shaft 11, that is journaled in vertically-sliding boxes 9, of shifting-clutch 14, having coupling-pin 17 and cam-arm 20, and of lever 15, for moving such clutch in and out of gear with such traction-wheel, substantially as set forth.

4. In a corn-planter, the combination, with traction-wheel 12, having sockets 13 and being mounted upon shaft 11, journaled in boxes 9, vertically guided between pendants 7 of the frame and coupled to vertically-movable frames 21, arranged to be raised and lowered by suitable connection with lever 25, substantially as set forth.

5. In a corn-planter, the combination, with clutch 14, driven by traction-wheel 12 and having cam-arm 20, of oscillating bar 49, and of rocker-shaft 51, with arms 52 and 53 for transmitting a vibrating movement to lever 48, substantially as set forth.

In testimony whereof I affix my signature in presence of two witnesses.

EMIL TYDEN.

Witnesses:
WM. H. LOTZ,
OTTO LUBKERT.